(No Model.)

J. HOLLINGER & J. FLINNER.
Gate.

No. 229,412. Patented June 29, 1880.

WITNESSES:
W. W. Hollingsworth
Edw. W. Byrn

INVENTORS:
J. Hollinger
J. Flinner
BY
ATTORNEYS.

N. PETERS, PHOTO-LITHOGRAPHER, WASHINGTON, D.C.

UNITED STATES PATENT OFFICE.

JACOB HOLLINGER AND JOHN FLINNER, OF MILLERSBURG, OHIO.

GATE.

SPECIFICATION forming part of Letters Patent No. 229,412, dated June 29, 1880.

Application filed April 24, 1880. (No model.)

*To all whom it may concern:*

Be it known that we, JACOB HOLLINGER and JOHN FLINNER, of Millersburg, Holmes county, Ohio, have invented a new and Improved Gate; and we do hereby declare the following to be a full, clear, and exact description of the same, reference being had to the accompanying drawings, forming part of this specification, in which—

Figure 1:
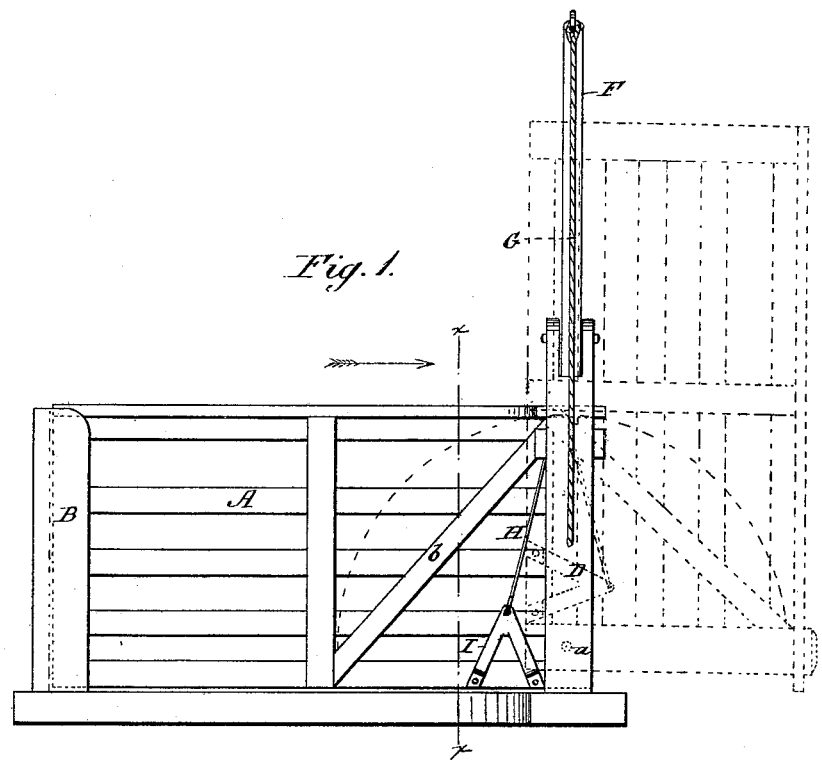
Figure 2:
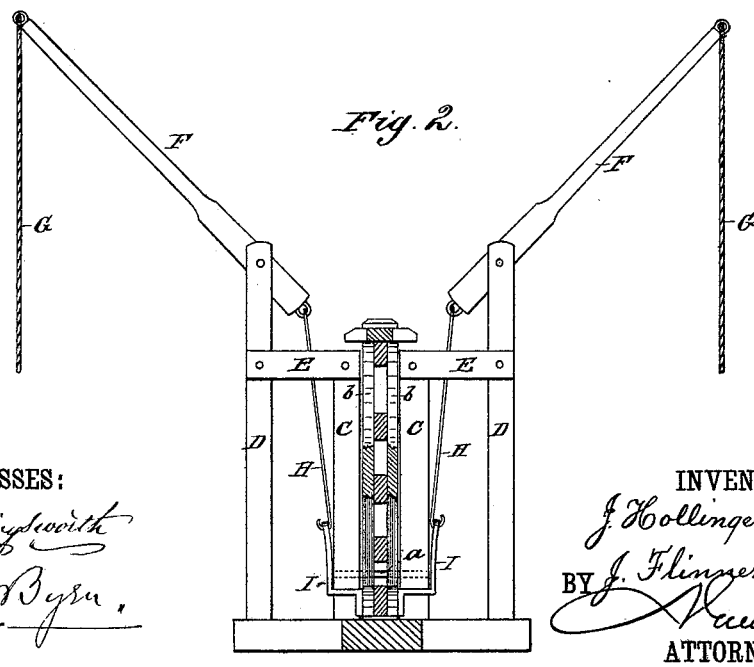

Figure 1 is a side view of the gate and its attachments. Fig. 2 is a vertical section through line $x\ x$ of Fig. 1, looking in the drection of the arrow.

Our invention relates to certain improvements in that form of gate which, instead of swinging horizontally on hinges, is fixed upon a horizontal pivot-bolt at one end between two posts, and is connected with rods and levers, whereby the gate is turned vertically over on its end when it is to be opened.

Our improvements consist, first, in a peculiar construction of the gate and in its arrangement to the two posts to which it is pivoted, whereby its movement is guided and rendered less liable to cramp and become inoperative; and, secondly, in the combination, with the gate and the rods for lifting it, of a peculiar construction of bracket, which both forms a connection between the rods and the gate and acts as a stop to prevent the gate from swinging over too far, as hereinafter fully described.

In the drawings, A represents the gate, and B a recessed post into which the free end of the gate fits and is held. At the other end the gate is pivoted upon a horizontal bolt, $a$, which passes through the two posts C C on each side of the gate and near the bottom thereof. These two posts, near their tops, are connected to other posts, D D, by braces E E, which posts D D stand at a little distance from the others on each side of the gate, and carry at the top levers F F, to whose outer ends are attached pull-ropes G G, while their inner ends are attached to the gate by rods H H.

As so far described the gate does not differ substantially from many forms heretofore constructed. In a gate operating on this principle, however, the gate, when partially raised, is, by reason of its leverage, especially liable to cramp or move badly, and to remedy this difficulty the guide-posts C C are placed close to each other, and the gate is provided on each side with diagonal strips $b$, which constitute the hypotenuse of a triangle formed in the lower corner of the pivoted end of the gate, and the thickness of these strips, added to that of the bars of the gate, and a slight allowance for play, just equals the distance between the guide-posts.

Now, we are aware that it is a common thing to provide a gate with diagonal braces, and we do not claim this broadly; but when these strips form the hypotenuse of the lower corner angle of the gate they co-operate with the posts C C in a peculiar way to cause the gate to be evenly and surely guided through its entire range of movement, for when the gate is raised the strips $b$ form the chords of the circumference which the posts describe over the gate, and their movement between the posts is therefore longitudinal, forming an unbroken guide for the gate which will not allow it to settle while moving into a cramped or distorted position.

In connecting the rods H to the gate, also, we form triangular offsetting brackets I, whose two legs are securely fastened to the bottom of the gate, and whose apex is loosely connected to the rods H. In constructing these brackets the amount of offset given them is a little greater than the width of the posts C, so that when the gate is lifted by the rods the apices of these brackets pass outside of the posts C and their bottom portions strike against the sides of the said posts and act as stops to prevent the gate from being thrown too far over. When the gate is in this elevated position, also, the apices of the brackets are thrown outside of the pivot of the gate and given a sufficient crank-purchase to start the gate back again by simply depressing the main levers F.

Having thus described our invention, we claim as new and desire to secure by Letters Patent—

1. The combination, with the guide-posts C C, of the gate A, pivoted between the same upon a horizontal bolt near the bottom, and having diagonal strips $b\ b$, forming the hypotenuse to the lower corner angle of the gate, which strips are arranged on opposite sides of the gate-bars and fill up the space between the gate-bars and the posts C C, so as to form continuous guides for the complete movement of the gate, as and for the purpose described.

2. The combination, with the posts C C and the gate A, pivoted upon a horizontal bolt between the same, of the offsetting triangular brackets I I and the connecting-rods and levers, whereby the said brackets are made to connect the gate to the operating device, and also to act as stops, as described.

The above specification of our invention signed by us this 5th day of April, 1880.

JACOB HOLLINGER.
JOHN FLINNER.

Witnesses:
M. B. DE SILVA,
DANIEL MCDONALD.